(12) United States Patent
Bovet et al.

(10) Patent No.: US 8,052,278 B2
(45) Date of Patent: Nov. 8, 2011

(54) RANDOMLY PIXELLATED OPTICAL COMPONENT, ITS FABRICATION METHOD AND ITS USE IN THE FABRICATION OF A TRANSPARENT OPTICAL ELEMENT

(75) Inventors: Christian Bovet, Charenton le Pont (FR); Jean-Paul Cano, Charenton le Pont (FR); Gilles Mathieu, Charenton le Pont (FR)

(73) Assignee: Essilor International (compagnie Generale d'optique, Charenton le Pont (FR)

( * ) Notice: Subject to any disclaimer, the term of this patent is extended or adjusted under 35 U.S.C. 154(b) by 465 days.

(21) Appl. No.: 11/996,118

(22) PCT Filed: Jul. 13, 2006

(86) PCT No.: PCT/IB2006/002911
§ 371 (c)(1),
(2), (4) Date: Jan. 18, 2008

(87) PCT Pub. No.: WO2007/010414
PCT Pub. Date: Jan. 25, 2007

(65) Prior Publication Data
US 2009/0115962 A1 May 7, 2009

(30) Foreign Application Priority Data
Jul. 20, 2005 (FR) ...................................... 05 07723

(51) Int. Cl.
*G02C 7/02* (2006.01)
*G02B 3/08* (2006.01)

(52) U.S. Cl. ...................................... 351/159; 359/741

(58) Field of Classification Search ............... 351/159; 345/49, 105, 107; 430/31–32, 34, 38; 204/450, 204/600; 250/70, 208.1; 438/929
See application file for complete search history.

(56) References Cited

U.S. PATENT DOCUMENTS

| 2,196,066 | A | * | 4/1940 | Feinbloom |
| 2,511,329 | A | * | 6/1950 | Craig |
| 3,460,960 | A | * | 8/1969 | Francel et al. |
| 3,532,038 | A | * | 10/1970 | Rottmann et al. |

(Continued)

FOREIGN PATENT DOCUMENTS

AU 779628 2/2005

(Continued)

OTHER PUBLICATIONS

Cognard, Philippe "Colles et adhesifs pour emballages, Generalities," 18 page. (English Summary Provided), (2004).

(Continued)

*Primary Examiner* — Dawayne Pinkney
(74) *Attorney, Agent, or Firm* — Occhiuti Rohlicek & Tsao LLP

(57) ABSTRACT

An optical component (10) comprises at least one transparent set of cells (15) juxtaposed parallel to a surface of the component, each cell having a size and a geometry that are different from those of its neighbors forming a network of cells with random distribution and random geometry, parallel to the surface of the component. Each cell is hermetically sealed and contains at least one substance with optical property. The invention also comprises a method of producing such an optical component and its use in the fabrication of an optical element. The optical element can in particular be a spectacle lens.

45 Claims, 1 Drawing Sheet

U.S. PATENT DOCUMENTS

| | | | |
|---|---|---|---|
| 3,628,854 A * | 12/1971 | Jampolsky | |
| 3,978,580 A * | 9/1976 | Leupp et al. | |
| 4,150,878 A * | 4/1979 | Barzilai et al. | |
| 4,268,132 A * | 5/1981 | Neefe | |
| 4,601,545 A * | 7/1986 | Kern | |
| 4,621,912 A * | 11/1986 | Meyer | |
| 4,720,173 A * | 1/1988 | Okada et al. | 349/156 |
| 4,791,417 A * | 12/1988 | Bobak | 345/89 |
| 4,994,664 A * | 2/1991 | Veldkamp | |
| 5,017,000 A * | 5/1991 | Cohen | |
| 5,044,742 A * | 9/1991 | Cohen | |
| 5,067,795 A * | 11/1991 | Senatore | |
| 5,139,707 A * | 8/1992 | Guglielmetti et al. | |
| 5,233,038 A * | 8/1993 | Guglielmetti et al. | |
| 5,359,444 A * | 10/1994 | Piosenka et al. | 349/13 |
| 5,529,725 A * | 6/1996 | Guglielmetti et al. | |
| 5,576,870 A * | 11/1996 | Ohmae | |
| 5,585,968 A * | 12/1996 | Guhman | |
| 5,604,280 A * | 2/1997 | Pozzo et al. | |
| 5,699,142 A * | 12/1997 | Lee et al. | |
| 5,733,077 A * | 3/1998 | MacIntosh | |
| 5,763,054 A * | 6/1998 | Samec et al. | |
| 5,764,333 A * | 6/1998 | Somsel | |
| 5,774,273 A | 6/1998 | Bornhorst | |
| 5,805,263 A | 9/1998 | Reymondet et al. | |
| 5,807,906 A | 9/1998 | Bonvallot et al. | |
| 5,812,235 A | 9/1998 | Seidner et al. | |
| 5,905,561 A | 5/1999 | Lee et al. | |
| 5,914,802 A | 6/1999 | Stappaerts et al. | |
| 6,019,914 A | 2/2000 | Lokshin et al. | |
| 6,118,510 A | 9/2000 | Bradshaw et al. | |
| 6,199,986 B1 | 3/2001 | Williams et al. | |
| 6,259,501 B1 | 7/2001 | Yaniv | |
| 6,274,288 B1 | 8/2001 | Kewitsch et al. | |
| 6,281,366 B1 | 8/2001 | Frigoli et al. | |
| 6,301,051 B1 | 10/2001 | Sankur | |
| 6,307,243 B1 | 10/2001 | Rhodes | |
| 6,309,803 B1 | 10/2001 | Coudray et al. | |
| 6,327,072 B1 | 12/2001 | Comiskey et al. | |
| 6,449,099 B2 | 9/2002 | Fujimoto et al. | |
| 6,485,599 B1 | 11/2002 | Glownia et al. | |
| 6,577,434 B2 | 6/2003 | Hamada | |
| 6,597,340 B1 | 7/2003 | Kawai | |
| 6,707,516 B1 | 3/2004 | Johnson et al. | |
| 6,712,466 B2 | 3/2004 | Dreher | |
| 6,871,951 B2 | 3/2005 | Blum et al. | |
| 6,934,088 B2 | 8/2005 | Lai et al. | |
| 6,963,435 B2 | 11/2005 | Mallya et al. | |
| 6,987,605 B2 | 1/2006 | Liang et al. | |
| 7,036,929 B1 | 5/2006 | Harvey | |
| 7,144,529 B1 | 12/2006 | Mercier | |
| 7,227,692 B2 | 6/2007 | Li et al. | |
| 7,289,260 B2 | 10/2007 | Kaufman et al. | |
| 7,404,637 B2 | 7/2008 | Miller et al. | |
| 7,533,453 B2 * | 5/2009 | Yancy | 29/557 |
| 7,715,107 B2 | 5/2010 | Loopstra et al. | |
| 2002/0008898 A1 | 1/2002 | Katase | |
| 2002/0016629 A1 | 2/2002 | Sandstedt et al. | |
| 2002/0080464 A1 | 6/2002 | Bruns | |
| 2002/0114054 A1 | 8/2002 | Rietjens | |
| 2002/0140899 A1 | 10/2002 | Blum et al. | |
| 2002/0145797 A1 | 10/2002 | Sales | |
| 2002/0167638 A1 | 11/2002 | Byun et al. | |
| 2002/0176963 A1 | 11/2002 | Chen et al. | |
| 2003/0003295 A1 * | 1/2003 | Dreher | |
| 2003/0021005 A1 | 1/2003 | Liang et al. | |
| 2003/0035199 A1 | 2/2003 | Liang et al. | |
| 2003/0081172 A1 | 5/2003 | Dreher | |
| 2003/0085906 A1 * | 5/2003 | Elliott et al. | 345/613 |
| 2003/0143391 A1 * | 7/2003 | Lai | |
| 2003/0147046 A1 | 8/2003 | Shadduck | |
| 2003/0152849 A1 | 8/2003 | Chan-Park et al. | |
| 2003/0174385 A1 | 9/2003 | Liang et al. | |
| 2003/0206260 A1 | 11/2003 | Kobayashi et al. | |
| 2004/0008319 A1 | 1/2004 | Lai et al. | |
| 2004/0027327 A1 | 2/2004 | LeCain et al. | |
| 2004/0114111 A1 | 6/2004 | Watanabe | |
| 2004/0120667 A1 | 6/2004 | Aylward et al. | |
| 2004/0125247 A1 | 7/2004 | Seshan et al. | |
| 2004/0125337 A1 | 7/2004 | Boulineau et al. | |
| 2004/0165252 A1 | 8/2004 | Liang et al. | |
| 2004/0169932 A1 | 9/2004 | Esch et al. | |
| 2004/0190115 A1 | 9/2004 | Liang et al. | |
| 2004/0233381 A1 | 11/2004 | Kim et al. | |
| 2006/0006336 A1 | 1/2006 | Cano et al. | |
| 2006/0087614 A1 | 4/2006 | Shadduck | |
| 2006/0279848 A1 | 12/2006 | Kuiper et al. | |
| 2007/0152560 A1 | 7/2007 | Naito et al. | |
| 2008/0068723 A1 * | 3/2008 | Jethmalani et al. | |
| 2008/0212018 A1 | 9/2008 | Ballet et al. | |
| 2008/0314499 A1 | 12/2008 | Begon et al. | |

FOREIGN PATENT DOCUMENTS

| | | |
|---|---|---|
| CA | 2340672 | 12/2000 |
| DE | 19714434 | 10/1998 |
| EP | 2561005 | 9/1985 |
| EP | 728572 | 8/1996 |
| EP | 1225458 | 7/2002 |
| EP | 1308770 | 5/2003 |
| FR | 2718447 | 10/1995 |
| FR | 2872589 | 1/2006 |
| WO | 00/77570 | 12/2000 |
| WO | 02/01281 | 1/2002 |
| WO | 02/065215 | 8/2002 |
| WO | 03/012542 | 2/2003 |
| WO | 03/077012 | 9/2003 |
| WO | 03/102673 | 12/2003 |
| WO | 2004/015481 | 2/2004 |
| WO | 2004/034095 | 4/2004 |
| WO | 2004/051354 | 6/2004 |
| WO | 2005/033782 | 4/2005 |
| WO | 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Fowles, Grant R. Introduction to Modern Optics. New York: Dover Publications, 1989. Print. pp. 138-139.

Hecht, Eugene, "Optics, 4th Edition" 2002 Addison Wesley, p. 428 (XP002465206) (chapter 10 from 2nd edition provided).

J-P. Perez, Optique: Fondements et Applications [Optics: Basics and Applications] 7th edition, published by Dunod, Oct. 2004, p. 262.

Kaufman U.S. Appl. No. 60/507,940 Drawing Sheets 4, 5, (2003).

David R. Lide, ed., CRC Handbook of Chemistry and Physics, 89th edition (internet version 2009), CRC Press/Taylor and Francis, Boca Raton, FL., pp. 10-12 through 10-13.

* cited by examiner

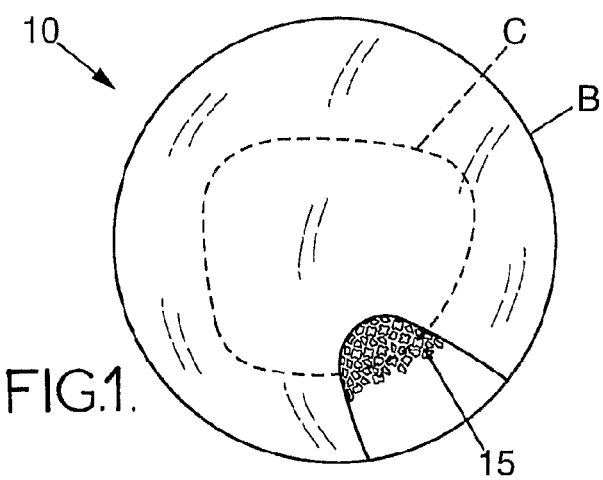
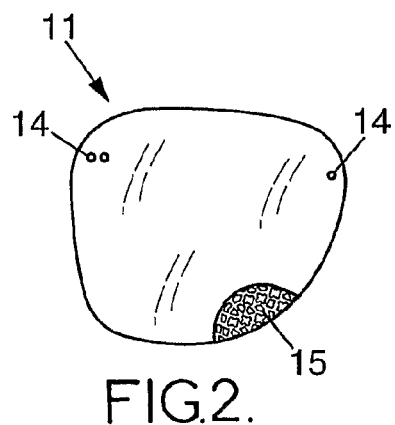
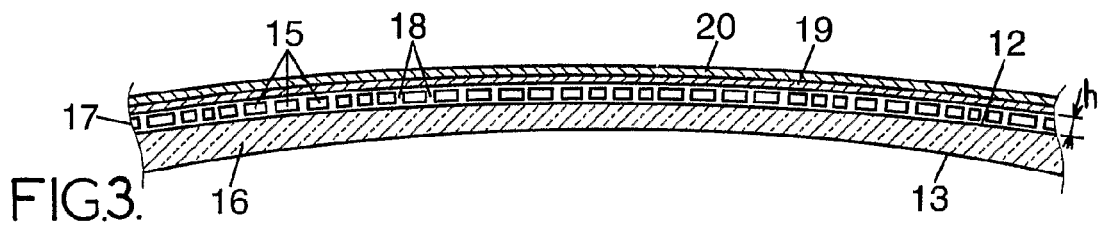
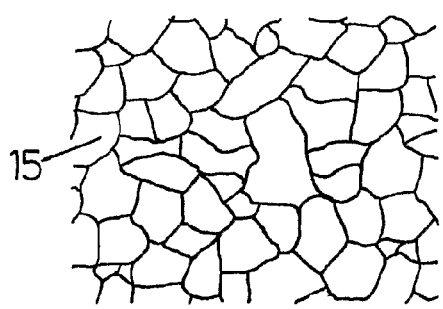
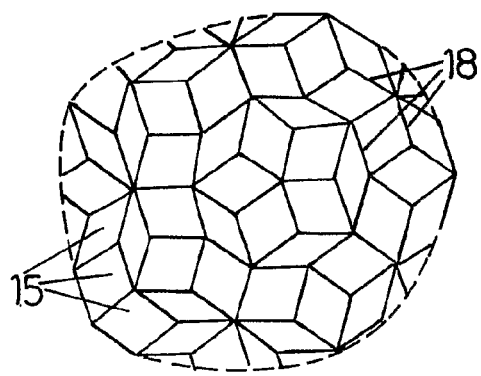
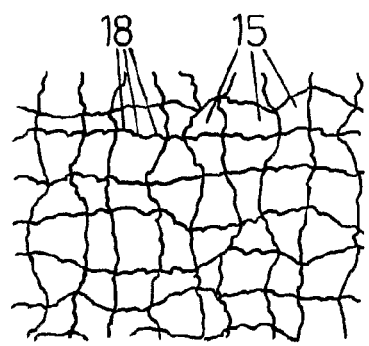
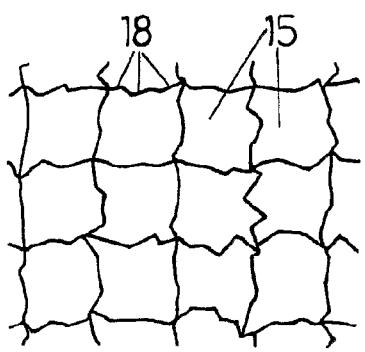

US 8,052,278 B2

RANDOMLY PIXELLATED OPTICAL COMPONENT, ITS FABRICATION METHOD AND ITS USE IN THE FABRICATION OF A TRANSPARENT OPTICAL ELEMENT

CROSS-REFERENCE TO RELATED APPLICATION

This application is the National Stage of International Application No. PCT/IB2006/002911, filed on Jul. 13, 2006, which claims the priority of French Application No. 0507723, filed on Jul. 20, 2005. The content of both applications are hereby incorporated by reference in their entirety.

The present invention relates to the production of pixellated, transparent optical components, comprising at least one pattern consisting of a network of cells with unstructured geometry, and incorporating optical functions. It applies to the production of a transparent optical element comprising such an optical component. This optical element can in particular be an ophthalmic lens with various optical properties.

One object of the present invention is to propose a structure that allows for the provision in an optical component of one or more optical functions in a flexible and modular manner, while retaining the capability of cutting and/or drilling the resulting optical element with a view to incorporating it in a frame that is imposed or chosen elsewhere, or in any other means of holding said optical element. Another aim is to make the optical element suitable for industrial engineering in good conditions.

The invention thus proposes an optical component, comprising at least one transparent set of cells juxtaposed parallel to a surface of the component, each cell having a size and a geometry that are different from those of its neighbours forming a network of cells with random distribution and random geometry, parallel to the surface of the component.

The invention also proposes an optical component comprising at least one transparent set of cells as defined previously, in which each cell is hermetically sealed and contains at least one substance with optical property.

The cells can be filled with various substances chosen for their optical properties, for example associated with their refraction index, their light absorption or polarization capability, their response to electrical or light stimuli, etc.

The invention also relates to an optical element including such an optical component. As an indication, such an optical element can consist of a spectacle lens in which the optical component according to the invention can confer an optical property on said spectacle lens.

The structure therefore lends itself to numerous applications, particularly those involving advanced optical functions. It requires a pixel-based discretization of the surface of the optical element, which offers a high degree of flexibility in the design and also in the implementation of the element.

This pixel-based discretization is characterized by its random nature both in its distribution and its geometry. Regarding the distribution, random means that there is no short-distance order of translation. In the frame of the invention, short-distance refers to a distance which is less than the pupil diameter, i.e. less than 5 mm, and preferably less than 1 mm. Regarding the geometry, random means, in the terms of reference of the invention, that each cell can have any finite geometrical shape comprising segments and/or arcs of circle, each segment or arc of circle being identical or different within each cell.

It is possible to produce structures pixellated by discretization which consist of a periodic succession of cells, with defined geometry, adjacent plane-wise and separated by walls. These walls cause a transparency defect of the optical component and, because of this, they can result in a transparency defect of the optical element including such a component.

Within the terms of reference of the invention, an optical component is understood to be transparent when the observation of an image through said optical component is perceived with no significant loss of contrast, that is, when the formation of an image through said optical component is obtained without adversely affecting the quality of the image. This definition of the term "transparent" can be applied, within the terms of reference of the invention, to all objects qualified as such in the description.

The walls separating the cells of the optical component interact with the light by diffracting it. Diffraction is defined as the light spreading effect that is observed when a light wave is physically limited (J-P. PEREZ—Optique, Fondements et applications 7th edition—DUNOD—October 2004, p. 262). Thus, an optical component including such walls transmits an image that is degraded because of this spreading of the light induced by said walls. The microscopic diffraction macroscopically results in diffusion. This macroscopic diffusion or incoherent diffusion results in a diffusing halo of the pixellated structure of the optical component and therefore in a loss of contrast of the image observed through said structure. This loss of contrast can be likened to a loss of transparency, as defined previously. This macroscopic diffusion effect is unacceptable for the production of an optical element including a pixellated optical component as understood within the terms of reference of the invention. This is all the more so in the case where said optical element is an ophthalmic lens, which needs on the one hand to be transparent, according to the meaning defined previously, and, on the other hand, to have no cosmetic defect that can hamper the vision of the wearer of such an optical element.

One means for reducing this macroscopic diffusion consists in reducing the diffraction at wall level. If we now consider a set of walls, reducing the diffraction by each of the walls will, at the macroscopic level, reduce the diffusing aspect of the set.

Producing a pixel-based discretization, with random distribution and geometry, on the surface of the optical component, is a way of obtaining a transparent optical component that is not diffractive even in the presence of an isolated light source. Deconstruction in the organization of the walls forming the network of cells is a way of breaking up the preferred directions of the diffraction. The network of cells with random distribution and random geometry thus makes it possible to transform the diffraction that can be observed in a network with periodic cell geometry into a diffraction with no impact on the quality of an image observed through said network. This macroscopic diffusion microscopically results in a spreading of the diffracted energy over the solid angle until a halo is obtained with no geometrical perception of a diffraction frequency. This spreading or dispersion of the diffraction is correlated with the random distribution nature of the walls forming the network of cells. The optical properties and cosmetic appearance of the optical component comprising such a network are thus improved in quality.

The random meshing according to the invention can be divided into three production variants:

The network of cells with random distribution and random geometry represents a macro-mesh pattern, said macro-mesh being able to cover the whole of the surface of the optical component; in this variant, the optical component, according to the invention, comprises a single macro-mesh consisting of a network of cells with random distribution and geometry. This macro-mesh can be of any geometry; it can be round, square or hexagonal, for example.

The network of cells with random distribution and random geometry represents a macro-mesh pattern, said macro-mesh being periodically replicated over the whole of the surface of the optical component; in this variant, the optical component, according to the invention, comprises a number of macro-meshes, each consisting of a network of cells with random distribution and geometry, and each macro-mesh being replicated according to a periodic distribution over the whole of the surface of said component; in other words, this variant allows for the production of a periodic tiling of macro-meshes, each consisting of a network of cells with random distribution and geometry.

The network of cells with random distribution and random geometry represents a macro-mesh pattern, said macro-mesh being replicated aperiodically over the whole of the surface of the optical component; in this variant, the optical component according to the invention comprises a number of macro-meshes, each consisting of a network of cells with random distribution and geometry, and each macro-mesh being replicated according to an aperiodic distribution over the whole of the surface of said component.

Within the context of the invention, the macro-mesh replicated according to a periodic or aperiodic distribution is identical or different over the whole of the surface of the optical component. Thus, it is possible within one and the same optical component to have over the whole of its surface, a number of macro-meshes, each consisting of an identical random network or of a random network that is different from one macro-mesh to another.

Within the context of an optical component having a network of cells with random distribution and random geometry, each cell is characterized by the following dimensional parameters:
the height (h) of the walls that separate each cell, this height being almost constant and identical for each cell of said network;
the thickness (e) of said walls (measured parallel to the surface of the component), this thickness being almost constant and identical for each wall forming said cell of said network;
the number of nodes and the geometrical positioning, according to a bidirectional axis (x, y) of each of the nodes forming each cell of said meshing, the number of nodes and their relative geometrical positioning being distributed randomly according to said bidirectional axis (x, y). The number of nodes and their relative positioning make it possible to define the surface area of each cell. The random distribution can thus be characterized by a cell surface area average and standard deviation that are allowable within the framework of the invention.

Parallel to the surface of the component, the cells will preferably be separated by walls of thickness (e) comprised from 0.10 μm to 5 μm. The set of cells advantageously forms a layer of a height (h) between 1 μm and 50 μm inclusive. Parallel to the surface of the component, the cells have, between two opposite walls, a maximum distance (D) of 500 μm. Advantageously, the cells have a distance (D) between 1 μm and 200 μm. The surface area of each cell within a macro-mesh varies from the identical surface area to ±70%. Advantageously, all cells within a macro-mesh have identical surface areas or surface areas varying within ±50%, and more preferentially within ±10%.

In a variant of the invention, the straight-line segment on one side of a wall forming the network of cells is broken down into unaligned continuous subsegments and/or into curvilinear segments. Similarly, the arc of circle on one side of a wall forming the network of cells can be broken down into unaligned continuous subsegments and/or into curvilinear segments. This optimization makes it possible to achieve a controlled standardization of the indicatrix of diffusion.

Within the context of the invention, the set of juxtaposed cells is preferably configured so that the fill factor $\tau$, defined by the surface area occupied by the cells filled by the substance, per unit of surface area of the component, is greater than 90%. In other words, the cells of the set occupy at least 90% of the surface area of the component, at least in a region of the component provided with the set of cells. Advantageously, the fill factor is between 90% and 99.5% inclusive.

Within the context of an optical component having a network of cells with random distribution and with random cell geometry, each macro-mesh is characterized by the following parameters:
the height (h1): this is identical to the height (h) of the walls that separate each cell;
the surface area of the macro-mesh: this quantity has no defined limits. Thus, a macro-mesh, in an embodiment of the invention, can cover the whole of the surface of the optical component. In this case, the macro-mesh must have a surface area at least identical to the surface area of the optical component. In another embodiment of the invention, the surface of the optical component is covered by a number of macro-meshes according to a periodic or aperiodic distribution. In this case, the constraint on the surface area of the macro-mesh is its distribution, which needs to allow for the whole of the surface of the optical component to be covered, without leaving free space unoccupied by a macro-mesh. It can therefore be easily understood that the important characteristic in this macro-mesh is not its intrinsic surface area relative to the surface area of the optical component, but its distribution.

The periodic or aperiodic distribution of the macro-mesh able to cover the whole of the surface of the optical component. In the case where the distribution of the macro-mesh is periodic, the periodicity represents a quadratic mesh, that is, a mesh having four sides of identical or different lengths and two axes of translation. In itself, the macro-mesh advantageously has a square or hexagonal geometry. In the case of an aperiodic system, the distribution of the macro-mesh is produced without short-distance or long-distance order of translation. Such a macro-mesh distribution can in particular be produced according to a Penrose tiling.

The set of cells can be formed directly on a rigid transparent support, or within a flexible transparent film which is then transferred onto a rigid transparent support. Said rigid transparent support can be convex, concave, or flat on the side receiving the set of cells.

The substance with optical property contained in at least some of the cells of the optical component is in liquid or gel form. Said substance can in particular have at least one of the optical properties chosen from coloration, photochromism, polarization and refraction index.

For the corrective lens fabrication application, it is advisable for different cells of the optical component to contain substances of different refraction index. The refraction index will typically be adapted to vary along the surface of the component, according to the estimated ametropy of an eye to be corrected.

For application to the fabrication of optical lenses having a polarization optical property, the cells of the optical component will in particular contain liquid crystals that may or may not be associated with dyes.

The set of cells of the optical component can include a number of groups of cells containing different substances. Similarly, each cell can be filled with a substance having one or more optical properties as described previously.

One subject of the present invention is also a method for producing an optical component as defined previously, which comprises:

the determination of a network of cells with random distribution and with random geometry by digital simulation and/or digital optimization based on a network of cells with geometrical and periodic distribution, said simulation and/or optimization comprising in particular the following steps:

defining a network of cells with polygonal mesh repeated periodically, displacing the nodes of the polygonal meshes in a plane (2D) according to one or more methods chosen from any displacement limited in the space, and preferentially a displacement around a point, a displacement around a circle and a displacement around a square;

optionally, adding new points, as mesh nodes, which themselves can be displaced according to the methods described previously;

producing a histogram of the segments and straight lines able to link the mesh nodes by digital simulation and/or digital optimization;

and stopping the iteration of the simulation and/or optimization until all the directions are obtained, that is, until a representation is obtained of all the diffraction propagation directions in order to obtain a spread diffraction;

the formation on a substrate of a network of cells parallel to said surface of the component, said network of cells having the random distribution and random geometry obtained according to the digital simulation as defined previously;

the collective or individual filling of the cells with the substance with optical property in liquid or gel form;

and the sealing of the cells on their side opposite to the substrate.

According to a preferred embodiment of the method, the meshing of cells with random distribution and geometry is determined by digital simulation and/or digital optimization based on a matrix comprising a periodically repeated polygonal mesh of hexagonal or square geometry. In such a method, the meshing with periodic distribution and with regular hexagonal geometry, constructed on a flat substrate, is defined by four parameters:

the pitch (a) of the periodic pattern identical on the three 120° axes of symmetry;

the thickness (b) of the wall between two adjacent cells;

the height (e) of the cells;

the respective complex indices ($n_a$, $n_s$) of the liquid and substrate media.

In the model used for this simulation and/or optimization, the height of the cells is considered to be small enough to consider the diffracting structure only as a simple two-dimensional phase and amplitude object. The diffracted wave is imaged in the plane of the wearer's retina. The distance (d) from the optical component to the pupil of the eye is not involved in image formation. The amplitude transmitted can be expressed by the convolution of the individual hexagonal pattern by a two-dimensional Dirac comb with triangular pattern (three axes at 120°), then multiplied by a disc function which is the pupil of the eye.

The latter expression facilitates that of the expression of the diffracted field in the Fourier space, itself imaged on the retina of the eye to within the geometrical aberrations of the eye.

The convolution operation is expressed by a simple multiplication in the Fourier space. The far-field diffracted amplitude is therefore the Fourier transform of the pupil of the eye (Airy disc) convoluted with the inverse pitch Dirac comb, itself multiplied by the Fourier transform of the hexagonal pattern.

It is this expression that is used to establish:

that the zero diffraction order (central Dirac peak) convoluted with the Fourier transform of the pupil incorporates the total energy useful for the formation of images;

that the zero order energy must be maximized and those of higher order must be minimized in order to be seen as spurious images.

Thus, in the context of the method of producing an optical component as described previously, the digital simulation based on a meshing of cells with periodic distribution and regular geometry generates a meshing of cells with random distribution and with random geometry in which:

the transmission of the wall is minimized to eliminate the modulation term as a function of the phase;

the geometry of the cells is modified so as to break the diffraction lines sent by the nodes of the meshes of the walls, the modification of the geometry being obtained by the displacement of each node in a bidirectional plane (x, y) according to two centred random variables;

the diffracted energy of the spurious orders is distributed in space by scrambling according to the directions corresponding to the diffraction image of a meshing of cells with periodic distribution and regular geometry.

The inventive method therefore makes it possible to define a random meshing of cells in which:

the preferred diffraction directions are broken up;

the sum of the wall lengths is increased in a controlled manner compared to the reference meshing, that is, the meshing of cells with periodic distribution and regular geometry;

the average surface area of the meshes and their footprint is controlled between the reference meshing and the random meshing.

In a variant of the method, the network of cells with random distribution and with random geometry is determined by digital simulation or digital optimization based on a distribution of points in a two-dimensional plane, said simulation being used to create a histogram of the segments and the straight lines able to link the different points, optionally adding new points in the two-dimensional plane, and stopping the iteration of the simulation until all the directions are obtained, that is, until a representation of all the propagation directions of the diffraction are obtained in order to obtain a spreading of this diffraction.

Thus, the method of implementing the pixellated optical component according to a random distribution and a random geometry provides a means for obtaining an optical component in which the texture of the spurious halo of the network of cells is similar to a texture according to the "Speckle" statistic, well known in coherent light diffusion. This spurious halo is in no way perceptible to the eye and does not under any circumstances create any nuisance regarding the clear perception of the optical component that includes it. This spurious halo is distinguished from the diffusion halo described previously and does not cause any reduction of the contrast of an image observed through an optical component comprising such a network.

Because of its pixellated structure, it is noteworthy that the optical component can be cut to required peripheral shapes, enabling it to be integrated in and adapted to various holding supports such as, for example, a frame or a helmet. The method can also comprise, without affecting the integrity of the structure, a step for drilling through the optical component to fix the optical element onto its securing support.

Yet another aspect of the invention relates to a transparent optical element, in particular a spectacle lens, produced by cutting such an optical component. A spectacle lens comprises an ophthalmic lens. The term ophthalmic lens is used to mean lenses adapted to a spectacle frame to protect the eye and/or correct the sight, these lenses being chosen from afocal, unifocal, bifocal, trifocal and progressive lenses. Although ophthalmic optics is a preferred field of the invention, it will be understood that this invention can be applied to transparent optical elements of other types, such as, for example, lenses for optical instruments, filters particularly for photography or astronomy, optical sighting lenses, ocular visors, optics of lighting systems, etc. Within the invention, ophthalmic optics includes ophthalmic lenses, but also contact lenses and ocular implants.

Other particular features and advantages of the present invention will become apparent from the description that follows of non-exhaustive exemplary embodiments, with reference to the appended drawings, in which:

FIG. 1 is a front view of an optical component according to the invention;

FIG. 2 is a front view of an optical element obtained from this optical component;

FIG. 3 is a cross-sectional schematic view of an optical component according to a first embodiment of the invention;

FIG. 4 is a front view, according to an embodiment of the invention, of a single macro-mesh able to cover the whole of the surface of an optical component; this macro-mesh comprises a network of cells with random distribution and geometry;

FIG. 5 is a front view of an aperiodic distribution of a macro-mesh according to a Penrose network;

FIG. 6 is a front view of a macro-mesh in which each straight-line segment of a wall is broken down into curvilinear segments;

FIG. 7 is a front view of a macro-mesh in which each straight-line segment of a wall is broken down into unaligned continuous subsegments.

The optical component 10 represented in FIG. 1 is a blank for spectacle lens. A spectacle lens comprises an ophthalmic lens, as defined previously. Naturally, although ophthalmic optics is a preferred field of the invention, it will be understood that this invention is applicable to transparent optical elements of other types.

FIG. 2 shows a spectacle lens 11 obtained by cutting the blank 10 around a predefined contour, represented by a broken line in FIG. 1. This contour is a priori arbitrary, in as much as it must be contained within the extent of the blank. Blanks fabricated in series can thus be used to obtain lenses adaptable to a wide variety of spectacle frames. The edge of the cut lens can without difficulty be trimmed, conventionally, to give it a shape suited to the frame and to the way the lens is fixed to this frame and/or for aesthetic reasons. Holes 14 can be drilled in it, for example to receive screws for fixing to the frame.

The general shape of the blank 10 can conform to industry standards, with, for example, a circular outline of 70 mm (millimetre) diameter, a convex front side 12, and a concave rear side 13 (FIG. 3). The traditional cutting, trimming and drilling tools can thus be used to obtain the lens 11 from the blank 10.

In FIGS. 1 and 2, a partial cutaway of the surface layers shows the pixellated structure of the blank 10 and of the lens 11. This structure consists of a network of cells or microtanks 15 formed in a layer 17 of the transparent component. In these figures, the dimensions of the layer 17, and of the cells 15, have been exaggerated compared to those of the blank 10 and of its substrate 16 in order to make it easier to read the drawing.

The lateral dimensions (D) of the cells 15 (parallel to the surface of the blank 10) are greater than a micron and can range up to a few millimetres. This network of cells can thus be produced with technologies that are well mastered in the field of microelectronics or micromechanical devices. One illustrative and non-limiting example would be methods such as hot pressing, hot embossing, micromoulding, photolithography (hard, soft, positive, negative), microdeposition such as printing by micro-contact, screen printing or even material jet printing.

The height (h) of the layer 17 forming the walls 18 is preferably between 1 µm and 50 µm. The walls 18 have a thickness (d) between 0.1 µm and 5.0 µm enabling in particular a high fill factor to be obtained.

The layer 17 incorporating the network of cells 15 can be covered by a certain number of additional layers 19, 20 (FIG. 3), as is usual in ophthalmic optics. These layers typically provide impact resistance, scratch resistance, colouring, anti-reflective, antifouling and other such functions. In the example shown, the layer 17 incorporating the network of cells is placed immediately above the transparent substrate 16, but it will be understood that one or more intermediate layers may be located between them, such as layers providing impact resistance, scratch resistance, colouring functions.

The transparent substrate 16 can be of mineral glass or of different polymer materials routinely used in ophthalmic optics. The polymer materials that can be used can include, as a by no means exhaustive indication, polycarbonates; polyamides; polyimides; polysulphones; copolymers of polyethylene terephthalate and polycarbonate; polyolefins, especially polynorbornenes; polymers and copolymers of diethylene glycol bis(allylcarbonate); (meth)acrylic polymers and copolymers including in particular (meth)acrylic polymers and copolymers derived from bisphenol-A; thio(meth)acrylic polymers and copolymers; urethane and thiourethane polymers and copolymers; epoxy polymers and copolymers; and episulphide polymers and copolymers.

The layer 17 incorporating the network of cells is preferably located on its convex front side 12, the concave rear side 13 remaining free to be reshaped by machining and polishing if necessary. The optical component can also be situated on the concave side of a lens. Naturally, the optical component can also be incorporated in a flat optical element.

The microtanks 15 are filled with the substance with optical property, in liquid or gel state. A prior treatment of the front side of the component may, if necessary, be applied to facilitate the surface wetting of the material of the walls and of the bottom of the microtanks. The solution or suspension forming the substance with optical property can be the same for all the microtanks of the network, in which case it can be introduced simply by immersing the component in an appropriate bath, by a screen-printing type method, by a spin process, by a method of spreading the substance using a roller or scraper, or even by a spray method. It is also possible to locally inject into the individual microtanks using a material printing head.

To hermetically seal a set of filled microtanks, a plastic film is typically applied, glued, thermally welded or hot laminated onto the top of the walls 18. It is also possible to deposit on the area to be blanked off a material that can be polymerized in solution, not miscible with the substance with optical property contained in the microtanks, then have this material polymerized, for example by heat or irradiation.

Once the network of microtanks 15 has been completed, the component can receive the additional layers or coatings 19, 20 to finish its fabrication. Components of this type are fabricated in series then stored to be taken out later and individually cut according to the requirements of a customer.

If the substance with optical property is not intended to remain in the liquid or gel state, a solidification treatment can be applied to it, for example a heating and/or irradiation sequence, at an appropriate stage from the moment when the substance has been deposited.

In a variant, the optical component made up of a network of microtanks is constructed in the form of a flexible transparent film. Such a film can be produced by techniques similar to those described previously. In this case, the film is produced on a flat support that is neither convex nor concave.

The film is, for example, fabricated industrially on a relatively large scale, then cut to the appropriate dimensions to be transferred onto the substrate 16 of a blank. This transfer can be performed by gluing the flexible film, by thermoforming the film, even by a physical vacuum adhesion effect. The film can then receive various coatings, as in the preceding case, or even be transferred to the substrate 16 itself coated by one or more additional layers as described previously.

In a field of application of the invention, the optical property of the substance introduced in the microtanks 15 relates to its refraction index. The refraction index of the substance is modulated along the surface of the component to obtain a corrective lens. In a first variant of the invention, the modulation can be produced by introducing substances of different indices on fabricating the network of microtanks 15.

In another variant of the invention, the modulation can be produced by introducing into the microtanks 15 a substance with a refraction index that can be adjusted subsequently by irradiation. The corrective optical function is then added by exposing the blank 10 or the glass 11 to light, the energy of which varies along the surface to obtain the index profile required in order to correct the vision of a patient. This light is typically that produced by a laser, the writing equipment being similar to that used to etch CD-ROMs or other optical memory media. The greater or lesser exposure of the photosensitive substance can result from a modulation of the power of the laser and/or the choice of exposure time.

Among the substances that can be used in this application there are, for example, the mesoporous materials or liquid crystals. These liquid crystals can be fixed by a polymerizing reaction, for example induced by irradiation. They can thus be fixed in a state chosen to introduce a predetermined optical delay into the light waves passing through them. In the case of a mesoporous material, the refraction index of the material is controlled through the variation of its porosity. Another possibility is to use photopolymers, one well known property of which is to change refraction index during the polymerizing reaction induced by irradiation. These changes of index are due to a modification of the density of the material and a change of the chemical structure. Preference will be given to the use of photopolymers which undergo only a very small variation in volume at the time of the polymerizing reaction.

The selective polymerization of the solution or suspension is achieved in the presence of a radiation that is spatially differentiated relative to the surface of the component, in order to obtain the required index modulation. This modulation is determined beforehand according to the estimated ametropy of the eye of a patient to be corrected.

In another application of the invention, the substance introduced in gel or liquid form into the microtanks has a polarization property. Amongst the substances used in this application of particular note are liquid crystals.

In another application of the invention, the substance introduced in liquid or gel form into the microtanks has a photochromic property. Among the substances used in this application there are, for example, the photochromic compounds containing a central pattern such as a spirooxazine, spiroindoline[2,3']benzoxazine, chromene, spiroxazine, homoazaadamantane, spirofluorene-(2H)-benzopyrane, naphtho[2,1-b]pyrane core.

In the context of the invention, the substance with optical property can be a colorant, or a pigment suitable for providing a modification of the transmission speed.

The invention claimed is:

1. A transparent optical element that is fabricated from an optical component comprising at least one transparent set of cells juxtaposed parallel to a surface of the component, each cell
   /a/ having a size and a geometry that are different from those of its neighbours, and
   /b/ further, being arranged with the remaining cells of the set of cells so as to form a network of cells with random distribution and random geometry, parallel to the surface of the component,
   the transparent optical element chosen from ophthalmic lenses, contact lenses, ocular implants, lenses for optical instruments, optical sighting lenses and ocular visors.

2. Optical element according to claim 1, comprising at least one transparent set of cells as described previously, in which each cell is hermetically sealed and contains at least one substance with optical property.

3. Optical element according to claim 1, in which the cells have any finite geometrical shape comprising segments and/or arcs of circle, each segment or arc of circle being identical or different within each cell, and a distribution over the whole of the surface of said optical component having no short distance order of translation.

4. Optical element according to claim 1, in which the network of cells with random distribution and random geometry represents a macro-mesh pattern, said macro-mesh being able to cover the whole of the surface of the optical component.

5. Optical element according to claim 1, in which the network of cells with random distribution and random geometry represents a macro-mesh pattern, said macro-mesh being periodically replicated over the whole of the surface of the optical component.

6. Optical element according to claim 1, in which the network of cells with random distribution and random geometry represents a macro-mesh pattern, said macro-mesh being replicated aperiodically over the whole of the surface of the optical component.

7. Optical element according to claim 5, in which the macro-mesh replicated according to a periodic or aperiodic distribution is identical or different over the whole of the surface of the optical component.

8. Optical element according to claim 4, in which the macro-mesh has a surface area at least identical to the surface area of said optical component.

9. Optical element according to claim 5, in which the replication of the macro-mesh over the whole of the surface of the optical component consists of a periodic or aperiodic distribution of said macro-mesh, said distribution not leaving any free space unoccupied by at least one macro-mesh on said surface of the optical component.

10. Optical element according to claim 5, in which the periodicity of the distribution of the macro-mesh represents a quadratic mesh, having four sides of identical or different lengths and two axes of translation.

11. Optical element according to claim 5, in which the macro-mesh has a geometry chosen from square and hexagonal.

12. Optical element according to claim 6, in which the aperiodicity of the distribution of the macro-mesh is produced without short-distance or long-distance order of translation.

13. Optical element according to claim 6, in which the aperiodic replication of the macro-mesh comprises a Penrose tiling.

14. Optical element according to claim 1, in which the cells are separated by walls of thickness (e) in a range between 0.10 µm to 5 µm.

15. Optical element according to claim 1, in which the set of cells advantageously forms a layer of height (h) in a range between 1 µm to 50 µm inclusive.

16. Optical element according to claim 1, in which, parallel to the surface of said component, the cells have, between two opposite walls, a maximum distance (D) of 500 µm.

17. Optical element according to claim 16, in which the distance (D) is in a range between 1 µm to 200 µm.

18. Optical element according to claim 1, in which the surface area of each cell within a macro-mesh represents a surface area between an identical value and a value to within ±70%.

19. Optical element according to claim 18, in which the surface area of each cell within a macro-mesh represents a surface area between an identical value and a value to within ±50%.

20. Optical element according to claim 18, in which the surface area of each cell within a macro-mesh represents a surface area between an identical value and a value to within ±10%.

21. Optical element according to claim 1, in which a fill factor is in a range between 90% to 99.5% inclusive.

22. Optical element according to claim 1, in which the straight-line segment on one side of a wall forming the network of cells is broken down into unaligned continuous subsegments and/or into curvilinear segments.

23. Optical element according to claim 1, in which the arc of circle on one side of a wall forming the network of cells is broken down into unaligned continuous subsegments and/or into curvilinear segments.

24. Optical element according to claim 1, in which the set of cells is formed directly on a rigid transparent support, or within a flexible transparent film which is then transferred onto a rigid transparent support.

25. Optical element according to claim 24, in which said rigid transparent support can be convex, concave or flat on the side receiving the set of cells.

26. Optical element according to claim 1, in which the substance with optical property contained in at least some of the cells of said optical component is in liquid or gel form.

27. Optical element according to claim 26, in which said substance has at least one of the optical properties chosen from coloration, photochromism, polarization and refraction index.

28. Spectacle lens, produced by cutting an optical component according to claim 1.

29. Spectacle lens according to claim 28, in which at least one hole is drilled through the component to fix the lens to a frame.

30. Optical element according to claim 1, in which the at least one transparent set of cells comprises a single set of cells that covers the whole of the surface of the optical component.

31. Optical element according to claim 1, in which the at least one transparent set of cells is replicated aperiodically over the whole of the surface of the optical component.

32. Method for producing a transparent optical element from an optical component, the transparent optical element chosen from ophthalmic lenses, contact lenses, ocular implants, lenses for optical instruments, optical sighting lenses and ocular visors, the method comprising the following steps:
   forming on a substrate a network of cells parallel to said surface of the component, said network of cells including cells having a size and a geometry that are different from those of its neighbours, the cells further being arranged so that the network of cells has a random distribution and a random geometry;
   the collective or individual filling of the cells with the substance with optical property in liquid or gel form;
   and sealing the cells on their side opposite to the substrate.

33. Method according to claim 32, in which the network of cells with random distribution and random geometry is determined by digital simulation and/or digital optimization based on a network of cells with geometrical and periodic distribution, said simulation and/or optimization comprising in particular the following steps:
   defining a network of cells with polygonal mesh repeated periodically, displacing the nodes of the polygonal meshes in a plane according to one or more methods chosen from any displacement limited in the space, which represents preferentially a displacement around a point, a displacement around a circle and a displacement around a square;
   optionally, adding new points, as mesh nodes, which themselves can be displaced according to the methods described previously;
   producing a histogram of the segments and straight lines able to link the mesh nodes by digital simulation and/or optimization;
   and stopping the iteration of the simulation and/or the optimization until all the directions are obtained, that is, until a representation is obtained of all the diffraction propagation directions in order to obtain a spread diffraction.

34. Method according to claim 32, in which the determination of the meshing of cells with random distribution and geometry is performed by digital simulation and/or optimization based on a matrix comprising a periodically repeated polygonal mesh of hexagonal or square geometry.

35. Method according to claim 32, in which the digital simulation and/or optimization based on a meshing of cells with periodic distribution and regular geometry generates a meshing of cells with random distribution and random geometry in which:
   the transmission of the wall is minimized to eliminate the modulation term as a function of the phase;
   the geometry of the cells is modified so as to break the diffraction lines emitted by the nodes of the meshes of the walls, the modification of the geometry being obtained by the displacement of each node in a bidirectional plane (x, y) according to two centred random variables;

the diffracted energy of the spurious orders is distributed in space by scrambling according to the directions corresponding to the diffraction image of a meshing of cells with periodic distribution and regular geometry.

36. Method according to claim 32, in which the digital simulation results in the definition of a random meshing of cells in which:
the preferred diffraction directions are broken up;
the sum of the wall lengths is increased by controlled manner compared to the reference meshing, that is, the meshing of cells with periodic distribution and regular geometry;
the average surface area of the meshes and their footprint is controlled between the reference meshing and the random meshing.

37. Method according to claim 33, in which the step for determining a network of cells with random distribution and random geometry is performed by digital simulation of points in a two-dimensional plane.

38. Method according to claim 33, in which the step for determining a network of cells with random distribution and random geometry is performed by digital optimization of points in a two-dimensional plane.

39. Method according to claim 32, in which the production of the optical component comprises the formation of the set of cells on a rigid transparent support.

40. Method according to claim 39, in which the production of the optical component comprises the formation of the set of cells within a flexible transparent film followed by the transfer of said film onto a rigid transparent support.

41. Method according to claim 32, in which the rigid transparent support is convex, concave or flat on the side receiving the set of cells.

42. Method of producing the transparent optical element, further comprising the following steps:
producing a transparent optical component according to claim 32;
and at least one step for cutting said optical component along a contour defined on said surface, corresponding to a shape determined for the optical element.

43. Production method according to claim 42, additionally comprising a step for drilling through said optical component to fix the optical element onto its securing support.

44. Method according to claim 32, in which the network of cells comprises a single set of cells that covers the whole of the surface of the optical component.

45. Method according to claim 32, in which the network of cells is replicated aperiodically over the whole of the surface of the optical component.

* * * * *